United States Patent [19]
Witt

[11] 3,802,461
[45] Apr. 9, 1974

[54] VALVE FOR USE ON A BLEED NIPPLE

[76] Inventor: John Edward Witt, 8 Taylor Close, Hampton Hill, Middlesex, England

[22] Filed: June 1, 1972

[21] Appl. No.: 258,630

[30] Foreign Application Priority Data
June 9, 1971   Great Britain ................ 19716/71
Aug. 10, 1971   Germany .......................... 37565

[52] U.S. Cl. ............................... 137/525, 137/351
[51] Int. Cl. ............................................. F16k 15/14
[58] Field of Search ............ 137/525, 525.1, 525.3, 137/613, 614.18, 516.15, 218, 525.5, 525.7, 351; 251/331, 342, 343, 344; 285/8

[56] References Cited
UNITED STATES PATENTS
2,771,093   11/1956   Wilson ..................... 137/543.17 X
3,132,665   5/1964   Rovin et al. ................ 137/525.3 X
3,417,775   12/1968   Smith ............................ 137/525 X
3,547,401   12/1970   Beall et al. .................... 251/342 X
2,893,221   7/1959   Bell ................................. 285/8 X Primary Examiner—William R. Cline
Attorney, Agent, or Firm—Pennie, Edmonds, Morton, Taylor and Adams

[57] ABSTRACT

A valve for use on a bleed nipple comprises a first tube portion closed at one end and having an aperture in its side wall and a second tube portion of flexible material surrounding the first tube portion so as to close the aperture, the open end of the first tube portion being suitable for fitting into a bleed nipple.

7 Claims, 7 Drawing Figures

PATENTED APR 9 1974 3,802,461

VALVE FOR USE ON A BLEED NIPPLE

BACKGROUND OF THE INVENTION

This invention relates to valves and in particular to brake bleed valves for use on vehicle hydraulic brakes and the like.

It is known to provide conventional brake bleed nipple with protective caps of neoprene or other flexible material.

SUMMARY OF THE INVENTION

It is an object of the invention to provide an improvement on the known protective caps which enables the brakes to be bled without removing the caps and which prevents the air from entering the brake system.

According to the invention, there is provided a valve for use on a bleed nipple, said valve comprising an integral tube of flexible material having a first tube portion including a closed end of said tube, said first tube portion having a side wall defining an aperture therein adjacent said closed end of said first tube portion, a second tube portion including an open end of said tube, and extending from the end of said first tube portion opposite to said closed end of said first tube portion towards said closed end of said first tube portion and over said aperture to close said aperture and means joining said first and second tube portions together for engaging a bleed nipple.

BRIEF DESCRIPTION OF THE DRAWINGS

The invention will now be further described, by way of example, with reference to the drawings, in which.

In the drawings, like parts are denoted by like reference numberals.

DESCRIPTION OF THE PREFERRED EMBODIMENTS

Figure 1:
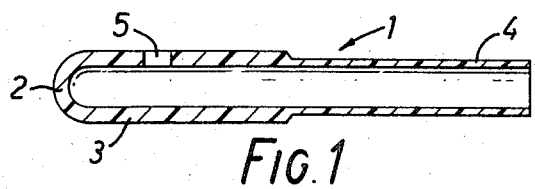
FIG. 1 is a cross-section through one embodiment of a valve according to the invention in its initial state.

Reference will first be made to FIG. 1 of the drawings which shows a tube 1 of flexible material closed at one end 2. The half 3 of the tube which is nearer the closed end 2 has a thicker wall than the half 4 which is nearer the open end. An aperture 5 is provided in the thicker wall portion 1. The thinner wall portion 2 is rolled back over the thicker wall portion 1 to form the arrangement illustrated in FIG. 2. Since the tube is made of flexible material this can be readily carried out. It will be observed that the aperture 5 is now covered by the thinner wall portion 2. This member can now be pushed over a bleed nipple 6 of a hydraulic system as shown in FIG. 3 and the valve is then ready for use.

Figure 2:
FIG. 2 is a cross-section of the valve shown in FIG. 1 when ready for use.
Figure 3:
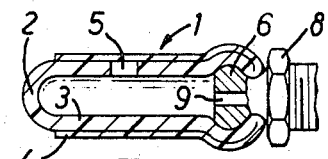
FIG. 3 is a cross-section showing the valve illustrated in FIGS. 1 and 2 in engagement with a bleed nipple of hydraulic system.
Figure 4:
FIG. 4 is a cross-section through a second embodiment of a valve according to the invention, showing the valve ready for use.
Figure 5:
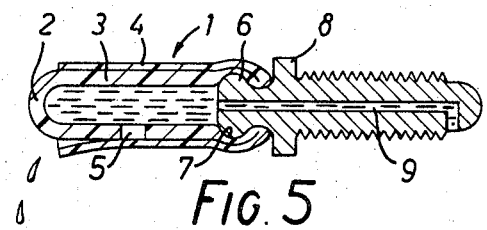
FIG. 5 is a cross-section showing the valve illustrated in FIG. 4 in operation on a bleed nipple.

The embodiment illustrated in FIGS. 4 and 5 differs from the embodiment illustrated in FIGS. 1 to 3 only in that a groove 7 is provided in the thicker wall portion 3 adjacent to the region where the thicker and thinner wall portions 3 and 4 merge. The groove 7 greatly improves gripping of the valve over the nipple 4 as shown in FIG. 5.

The operation of the valve according to the invention will now be described with reference to FIG. 5. In normal use, the valve serves merely as a protective cap to prevent the ingress of dirt and grease into the bleed nipple 7. When fluid is to be bled from the nipple 6, it is slackened one turn by means of the integral nut 8. The hydraulic system to which the nipple 6 is fitted can then be bled without the cap having to be removed from the nipple 6. For example, in the case of vehicle brakes, the brake pedal is operated. The increase in pressure causes the thinner wall portion 4 to be forced away from the aperture 5 and air can then pass out of the hydraulic system through the normal bore 9 in the bleed valve 6 and the aperture 5 and between the two wall portions 3 and 4. As soon as the pressure ceases, for example when the brake pedal has reached the bottom of its travel, the aperture 5 is again closed by the resiliency of the wall portion 4 which is reinforced by atmospheric pressure. Operation of the pedal four or five times is normally required to expel all of the air from the hydraulic system. The bleed nipple 6 can then be re-tightened by means of the nut 8.

It will be seen that the above described valve provides a cheap and simple way of bleeding hydraulic systems without the risk of air being sucked back into the system when pressure on the system is released. No jars or additional tubes are needed.

The use of tubes and jars on brake bleeding systems has been mainly required so that, by keeping the tube attached to the brake nipple with its free end beneath the brake fluid, air is prevented from reentering the system when the brake pedal is released. While the use of the tube and jar is not necessary for this purpose because of the effective non-return arrangement provided, it must be admitted that brake fluid will of course pass through the valve during the bleeding of the brakes. The amount of brake fluid is often relatively small, but, where considerable repairs to the brake systems has been carried out, for which the brake system has had to be drained, considerable amounts of brake fluid must pass through the system in order to ensure that the air is fully bled. As a result, if the valves so far described are used in such a circumstance, very considerable amounts of brake fluid will pass through the non-return valve and will to a considerable extent impregnate the floor of the garage or workshop in which the brake bleeding is being done. It is therefore desirable that some means is provided for enabling the brake fluid to be collected.

Two embodiments will now be described in which provision is made for enabling brake fluid passing through the valve to be collected. These embodiments shown in FIGS. 6 and 7, are modifications of the embodiments shown in FIGS. 3 and 5 respectively.

Figure 6:
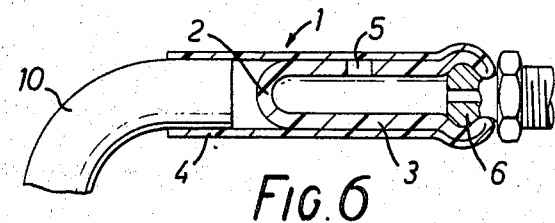
FIG. 6 is a cross-section through a third embodiment of the valve engaged with a bleed nipple of a hydraulic system and having an extension tube attached thereto.
Figure 7:
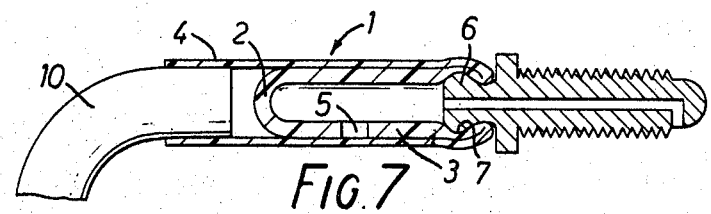
FIG. 7 is a similar cross section through a fourth embodiment of a valve according to the invention also with an extension tube.

Referring now to FIGS. 6 and 7, it will be seen that the construction of these valves is generally similar to that of the embodiments shown in FIGS. 3 and 5.

However, unlike in these previous embodiments, it will be seen that the half 4 of the tube 1 which has the thinner wall is longer than the half 3 of the tube 1 which has the thicker wall, and therefore the thinner wall portion extends beyond the closed end 2 of the tube so as to form connection member for an extension tube 10 adapted to carry away the brake fluid. This tube 10 may conveniently feed the brake fluid into a jar or container.

It will however be noted that unlike normal brake bleed systems, there is no necessity whatsoever for the tube 10 to extend beneath the level of the brake fluid in the jar or container and therefore the positioning of the jar or container is not in any way critical. The operation of the valve is the same as that of the valves of FIGS. 3 and 5.

It will be appreciated that certain modifications can be made to the above described embodiments without departing from the scope of the invention. For example, the extension of the tube (FIGS. 6 and 7) may be so shaped or bent that the brake fluid may be guided by this extension straight into a container without the necessity of the additional tube 10.

The valve according to the invention has the additional advantage that it acts as a protective cap when not being used as a non-return valve. Moreover, the cap/valves are fitted externally of the hydraulic system and can be put in place without disturbing the system at all.

The valve is desirably made of neoprene but any similar flexible and/or resilient material may be used if desired.

It will be understood that the above description of the present invention is susceptible to various modifications, changes and adaptations.

I claim:

1. A valve for use on a bleed nipple, said valve comprising an integral tube of flexible material having a first tube portion including a closed end of said tube, said first tube portion having a side wall defining an aperture therein adjacent said closed end of said first tube portion, a second tube portion including an open end of said tube, and extending from the end of said first tube portion opposite to said closed end of said first tube portion towards said closed end of said first tube portion and over said aperture to close said aperture and means joining said first and second tube portions together for engaging a bleed nipple.

2. A valve as defined in claim 1, wherein said tube comprises lengths of different thicknesses.

3. A valve as defined in claim 1, wherein said first tube portion comprises a length of tube of a thickness greater than that of said second tube portion.

4. A valve as defined in claim 1, wherein said means joining said first and second tube portions together comprises a tube length defining a groove for seating on said bleed nipple.

5. A valve as defined in claim 1, wherein said first tube portion and said second tube portion are of equal length.

6. A valve as defined in claim 1, wherein said second tube portion is longer than said first tube portion and extends beyond said closed end of said first tube portion.

7. A valve as defined in claim 6, further comprising means on said second tube portion for receiving an extension tube.

* * * * *